Oct. 20, 1936. E. PICK Re. 20,139

HEAT EXCHANGER

Original Filed Sept. 21, 1934 3 Sheets-Sheet 1

Inventor

Eric Pick,

By K. P. McElroy

Attorney

Oct. 20, 1936.

E. PICK

Re. 20,139

HEAT EXCHANGER

Original Filed Sept. 21, 1934 3 Sheets-Sheet 2

Inventor

Eric Pick,

By K. P. McElroy

Attorney

Oct. 20, 1936. E. PICK Re. 20,139
HEAT EXCHANGER
Original Filed Sept. 21, 1934 3 Sheets-Sheet 3
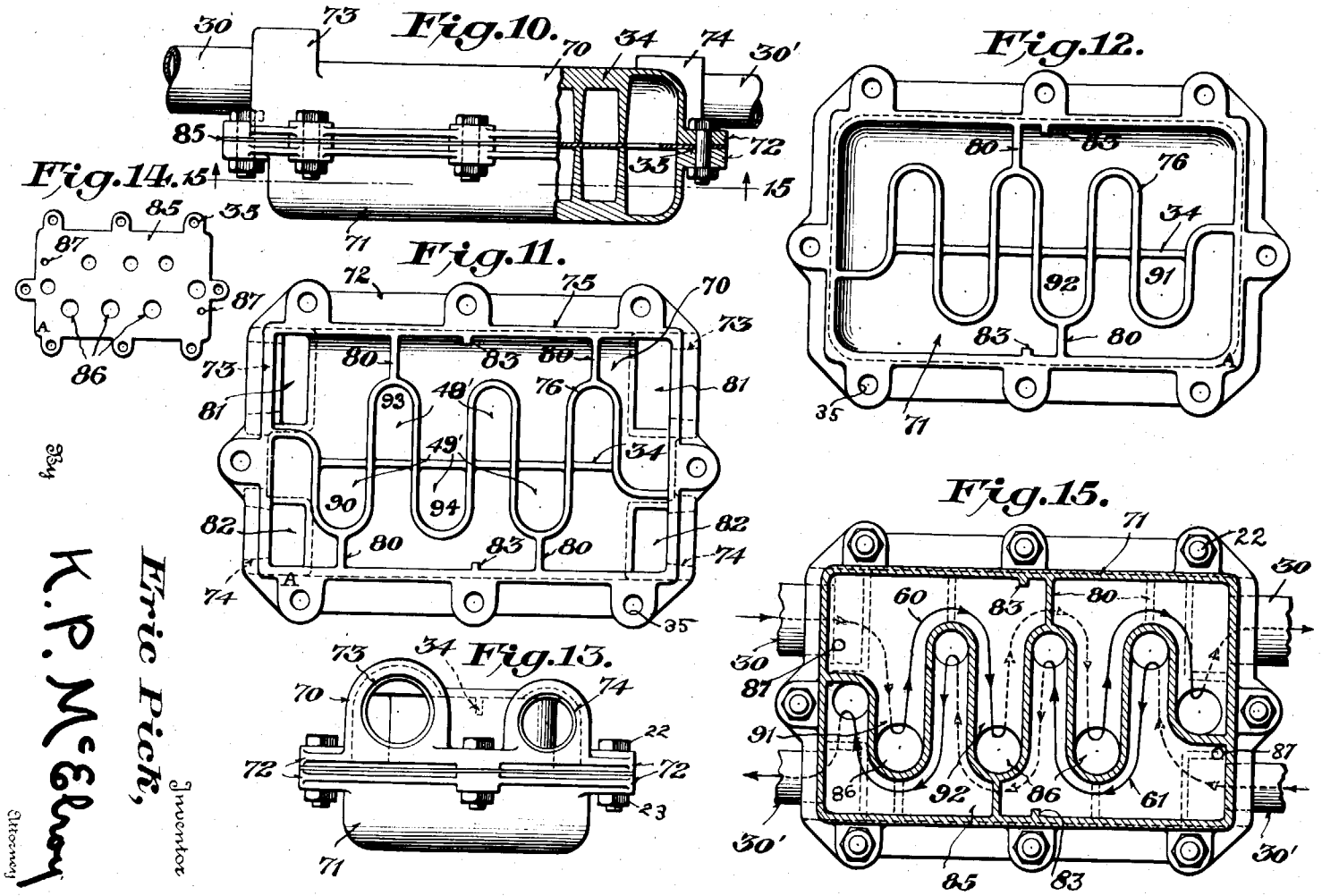
Inventor
Eric Pick,
By K. P. McElroy
Attorney Reissued Oct. 20, 1936

Re. 20,139

UNITED STATES PATENT OFFICE 20,139

HEAT EXCHANGER

Eric Pick, New York, N. Y., assignor to The Permutit Company (1934), Wilmington, Del., a corporation of Delaware Original No. 2,003,758, dated June 4, 1935, Serial No. 744,972, September 21, 1934. Application for reissue August 6, 1936, Serial No. 94,718

20 Claims. (Cl. 257—245)

This invention relates to heat exchangers; and it comprises an improved heat exchange apparatus having a plurality of members closed on one face and provided with open channels on the other face, the members being assembled into a unit with the open faces juxtaposed, the unitary assemblage having a plurality of separate, tortuous immediately adjacent passageways for fluids, the open channels of each member being so arranged as to form parts of the fluid passageways in the assembled unit, the apparatus having ported separator means between the members for establishing passageway connections between members, the apparatus having conduit connections for each set of passageways and means for holding the members together; all as more fully hereinafter set forth and as claimed.

Heat exchange apparatus in general comprises means for bringing two fluids (gas or liquid) into intimate heat transferring relationship, as by providing flow conduits separated by a thin wall of metal such as iron, copper and its alloys or aluminum. For efficient heat exchange, the area of heat exchanging relationship (through the dividing wall) for the two fluids should be large.

In conventional heat exchange design, at least one of the conduits for the two fluids is tubular piping. Sometimes concentric pipes are provided, forming two conduits; sometimes two pipes are laid closely adjacent and usually arranged in coils to save space; and sometimes a coil or nest of pipe containing one fluid is immersed in a surrounding body of the other fluid. In these conventional designs, it is not desirable to have the cross-sectional area of the conduit large, because in this case the flow of liquid, for example, through the conduit under ordinary pressures is stream-line and the central portions of the flowing stream do not come into contact with the conduit walls. Unless liquid actually comes into contact with the conduit walls, heat exchange is in general impossible. Most liquids are poor heat conductors. Moreover, in stream-line flow conditions the rate of flow through the conduit is greatest in the center and diminishes to a low value adjacent the walls. In effect, thin films of liquid moving slowly along the wall are the only portions of the liquid brought into efficient heat exchanging relationship with the wall and hence with the other fluid. Stream-line flow can be broken up, and turbulent flow maintained, by making the conduit diameter small. Accordingly, it is customary to provide relatively small conduits, which necessitates great length in order to secure the required area. The smaller the conduit, the greater the pressure required to force liquid therethrough. This sets a practical limit for the conduit size. Conventional type heat exchangers with large conduits are inefficient thermally. With small conduits they are inefficient mechanically; pressure losses for a given volume flow rate are high.

Whatever the arrangement, in operation it is usual to flow the two fluids in countercurrent through the apparatus.

The ordinary heat exchange apparatus of tubular construction is low in efficiency and moreover is difficult to construct. The many pipe joints give opportunity for leakage to occur, particularly under high pressures. Attempts have been made to improve upon conventional construction. It has been proposed to cast the conduits for fluid flows in a unitary block. Such proposals are, however, difficult to embody in practice, because of the obstacles in the way of producing a single casting containing winding fluid channels enclosed therein. It has been further proposed to make up a heat exchanger of a large number of small discoid segments, each having portions of spiral passageways for two liquids; but such arrangements require almost as many joints as ordinary tubular apparatus, and in addition they have many of the disadvantages of cylindrical conduit systems. Flow through a simple helical passage tends to be streamline unless high velocities, with resulting high pressure losses, are used.

According to the present invention, I provide an improved heat exchange apparatus made up usually of two unitary elements, each element having open channels or grooves on one side and being closed or encased on the other side, the channels being so disposed that when the elements are assembled the outer faces provide a solid casing, while on the inside two separate, adjacent, winding passageways are provided extending through the assembly and separated by thin walls. Ported separator means are interposed between the elements to make interchannel connections between elements. Fluid connections are provided at the extremities of the passages. Each element is of open shape readily formed by simple casting methods. The new heat exchanger is cheap to build and furthermore is highly efficient; much more so than any of the prior designs mentioned. The channels, while of large cross-section, are so arranged that the flow of fluid therethrough is turbulent even at low pressures. Streamline flow, with formation of hot or cold centers in the flow, is prevented. At the same time, fluid resistance is kept low; the cross-sectional area of the passages is large. The apparatus can be readily assembled and disassembled for cleaning purposes.

In the accompanying drawings I have shown, more or less diagrammatically, several specific embodiments of apparatus within the invention.

In the showings,

Fig. 10 is a view partly in elevation and partly in vertical section of another specific embodiment of the invention;

Fig. 11 is a plan view of the top member of the apparatus of Fig. 10;

Fig. 12 is a plan view of the bottom member;

Fig. 13 is an end view of the apparatus of Fig. 10;

Fig. 14 is a plan view of the gasket used with this embodiment, and

Fig. 15 is a sectional view taken along line 15—15 of Fig. 10 and showing the course of fluids through the apparatus of Figs. 10 to 14.

Figure 2:
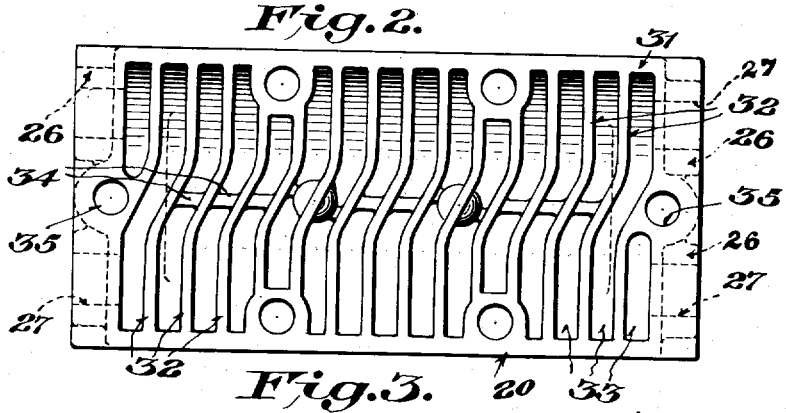
Fig. 2 is a plan view of the top member of Fig. 1.
Figure 3:
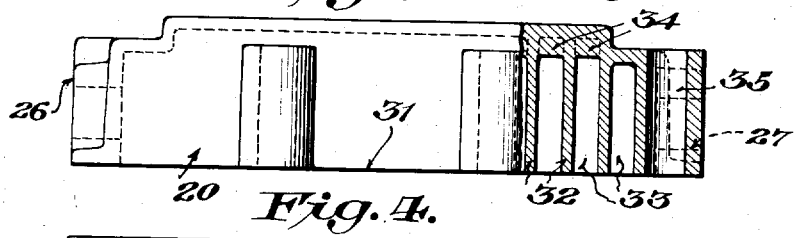
Fig. 3 is a view partly in elevation and partly in vertical section of the member of Fig. 2.

The heat exchanger shown in Figs. 1 to 5 comprises a top channeled member 20 and bottom channeled member 21, the two members being bolted together by a plurality of tie-bolts 22 with nuts 23; a port plate 24 and two gaskets 25 being interposed between the two members. In this modification, the two members are alike except that the top member is formed with two bosses 26 at each end having bores 27 therethrough adapted to receive the ends of fluid conduits indicated at 30, the bores in most cases being threaded to receive ordinary threaded pipe. The top channeled member is shown in plan in Fig. 2 and in section in Figs. 3 and 5. As shown, the member 20 has an outer casing portion 31 of general cylindrical contour and a plurality of partitions 32 of roughly semi-circular shape integral with the casing and forming a plurality of open cavities or channels 33 in the member side by side. The channels or cavities are so arranged that each end of one channel in one member overlaps or registers with one end of one of two channels in the other member, the two channels being spaced apart and separated by a third channel in the other member. A low rib 34 extends along the length of the member. The purpose of this rib is to give additional structural strength and to promote turbulence in the fluid flow through the channels. A plurality of round holes 35 are provided around the periphery of the member to receive the tie-bolts 22. The lower member 21 is similar in channel arrangement to the upper member. The only difference between the two members is the provision of the conduit connection bosses 26 on the upper member alone. Usually the members are cast. The same pattern can be used for each, the casting pattern being provided with removable pieces corresponding to bosses 26 which are left in when the upper member is cast and removed when the lower member is cast. Bores 27 can be provided during the casting, or the bosses can be left solid and drilled out afterwards. If desired, both members can be cast with bosses, the members in this case being exactly alike; and only one set of bosses drilled out subsequently.

Figure 4:
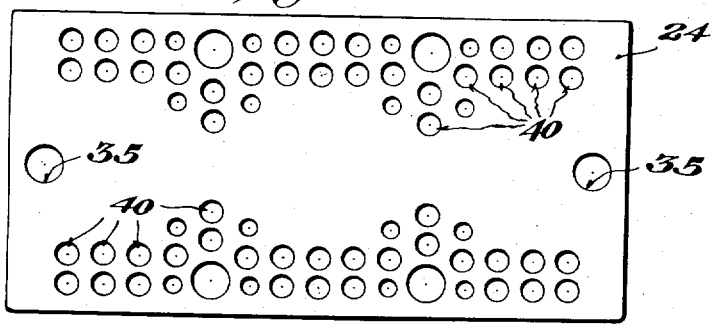
Fig. 4 is a plan view of the separator plate used in the embodiment of Fig. 1.
Figure 1:
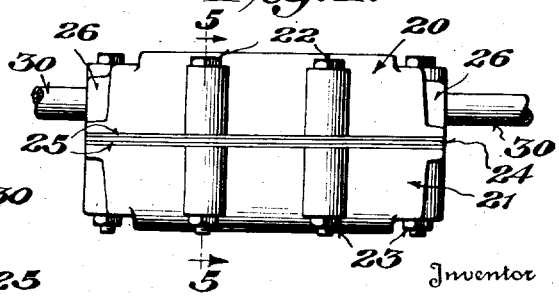
Fig. 1 is a view in elevation of one embodiment of the invention.
Figure 5:
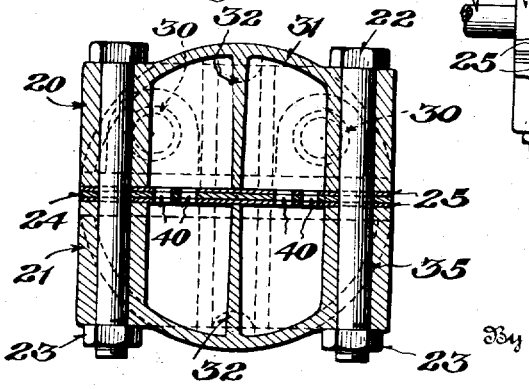
Fig. 5 is a cross-sectional view taken along line 5—5 of Fig. 1.

In this embodiment, a rigid separator plate between the two members is required to properly connect the channels of the two members so as to provide in the apparatus two separate winding channels leading from one end of the apparatus to the other. The separator plate 24 is shown in Fig. 4. It is a thin metal plate with a plurality of fluid bores 40 therein and holes 35 for the tie-bolts. When the two channeled members are bolted together with the separator plate between them, two separate spiraling winding passages are formed in the assembly. The bores 40 serve to establish communication between overlapping ends of channels in the two members. Usually it is desirable to employ a gasket between the separator plate and each member, as shown in Fig. 1. The gasket is exactly the same size and of the same bore arrangement as the separator plate and is made of material appropriate to the conditions under which the heat exchanger is used. The gasket is made of material adapted to withstand the operating temperatures to which the apparatus is subjected, and to withstand corrosive action of the fluids. Various composition materials are suitable, the compositions sometimes being reinforced by a metal cloth insertion. Lead or soft copper is sometimes employed.

Figure 6:
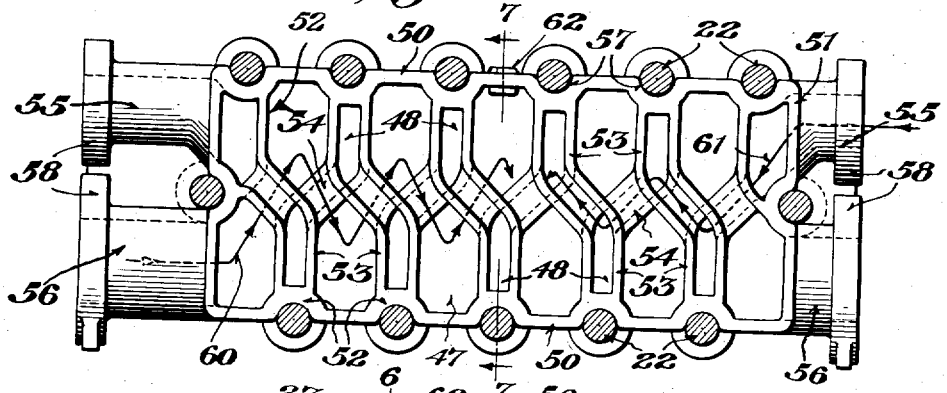
Fig. 6 is a plan view of a modified form of heat exchanger, one cover member being left off in this figure.
Figure 7:
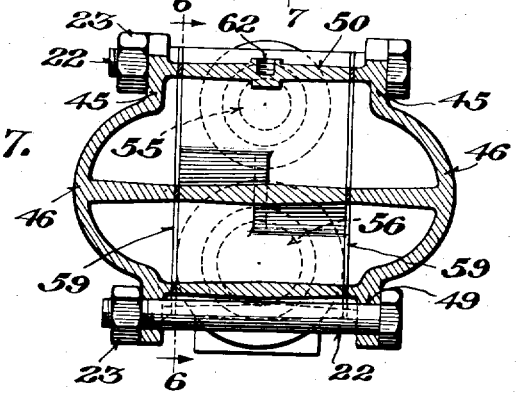
Fig. 7 is a cross-section of the apparatus taken along line 7—7 of Fig. 6 and showing both cover members.
Figure 8:
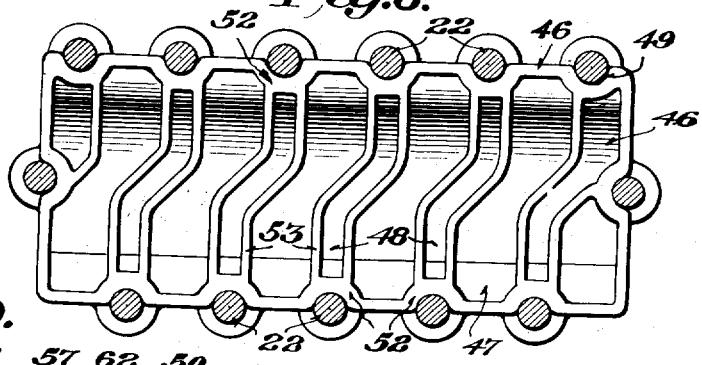
Fig. 8 is a plan view of a cover member of the apparatus of Fig. 6.
Figure 9:
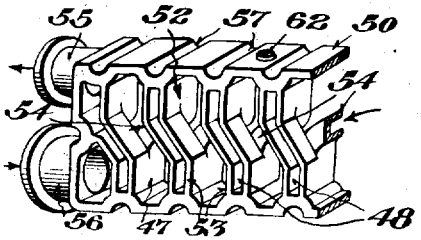
Fig. 9 is a perspective view of one end of the separator member in the apparatus of Fig. 6, showing the flow channel arrangement in the separator member.

Figs. 6 to 9 show a modified form of heat exchanger wherein the separator member is of greater thickness than in the first described modification and also contains the fluid conduit connections. The apparatus comprises two channeled cover members 45, exactly alike and of general semi-circular longitudinal cross-section. Each cover member comprises a casing portion 46 having a partition system 52 comprising partitions 53 disposed therein so as to form a plurality of channels 47 and 48. In this specific embodiment the passages for the two fluids are shown as of different cross-sectional area. The passage of which channels 48 form a part is smaller than that formed by channels 47. The channels or cavities are so arranged that each end of one channel in one cover member is opposed to one end of one of two channels in the other cover member. The cover member is shown as having perforations 49 for receiving the shanks of tie-bolts 22. Fig. 6 shows a separator member 50 superposed on one cover member, the other cover member being left off in this view for clarity. As shown, the separator member has a casing portion 51 of general rectangular shape. A branching open-faced partition system 52 is provided in the casing and integral with the casing. This arrangement is shown most clearly in Fig. 9, which is a perspective view of one end of the separator member. The partition system comprises adjacent partition members 53 enclosing therebetween open-faced channels 48 and branched as at 54. Upon the faces of the separator being closed by the cover members the closed channels 48 extend continuously from one end of the apparatus to the other, while inter-partition channels 47 are provided, forming a closed continuous channel extending from one end of the apparatus to the other. The channels and inter-partition spaces of the separator member establish communication between opposing channel ends in the two cover members. At each end of the separator member are two connection bosses, 55 and 56, for the two fluids. The connections are of different size. Connection 55 is in communication with the smaller passageway formed of channels 48; connection 56 delivers to the larger passageway formed of channels 47. The separator member has indentations 57 for receiving the bolt shanks, corresponding to perforation 49 in the cover members. The fluid connections 55 and 56 are shown as being flanged as at 58. This construction is desirable as it allows any number of heat exchanger units to be readily bolted together in case larger heat exchange capacity is required than that afforded by a single unit. When the two cover members and the separator are bolted together, appropriate gaskets being provided as at 59, the two separate winding fluid channels are formed in the apparatus in a way similar to the first described embodiment. The quasi-elliptical cross-sectional shape of the apparatus as is shown in Fig. 7 is a desirable one as it promotes turbulence of the fluid flows better than a purely circular cross-section (helical passages). The course of liquids through this apparatus is indicated in Fig. 6 as at 60 for the larger flow and as at 61 for the smaller flow. A threaded socket 62 is advantageously provided in the separator member 50, to receive an eyebolt (not shown) or the like for handling the apparatus.

The exchanger of Figs. 6 to 9 is a remarkably efficient apparatus. In case extreme simplicity is desired rather than maximum efficiency, cover members 45 can take the form of flat-surfaced plates.

Figs. 10 to 15 show a third modification in which the channel arrangement is such that use of a rigid separator plate is obviated. In this modification the upper and lower channeled members are similar, but are not exactly alike. Fig. 10 shows the assembled unit having a channeled top member 70 and a channeled bottom member 71, each member being flanged as at 72. The flanges are provided with a plurality of holes 35 for tie-bolts as shown. The two channeled members are tied together with a plurality of bolts and nuts 22, 23 as in the previously described embodiments. The top member is provided at each end with two fluid connection extensions 73 and 74 receiving a larger conduit 30 and a smaller conduit 30', respectively. These extensions are advantageously threaded to receive the usual threaded pipe connections or they may be provided with flanges or other convenient connection means. Fig. 11 is a plan view of the top member which is shown as having a casing 75 of general rectangular form and integral with flanges 72 and an integral, single, looped partition 76 extending from one end of the member to the other. This specific embodiment is shown as having different sized passages. The loop is so proportioned that series of smaller channels 48' and larger channels 49' are formed in the member. Partitions 80 are provided between the looped partition and the walls, as shown, forming a plurality of open, separate cavities in the member. A rib 34 is provided in the top of the casing as in the first described embodiment, for assisting and promoting turbulent flow. The channeled member has orifices 81 and 82 at each end leading to the fluid connections 73 and 74, respectively. Ribs 83 are provided on the casing walls to aid in promoting turbulence.

The lower channeled member, shown in plan in Fig. 12, has a similar partition arrangement, including looped partition 76 and partitions 80, forming with the partition 76 a plurality of open, separate cavities in the member and is generally similar to the top member except for the omission of the fluid connections. The two members when bolted together, as shown in Figs. 10 and 13, are adapted to form two separate tortuous passageways or channels extending from one end of the casing to the other end. Each end of any one cavity in one member overlaps one end of two cavities in the other member, the two cavities being spaced apart and separated by the end of a third cavity in the other member. For example, a U-shaped cavity in member 71 has ends 91 and 92. Upon assembly the end 91 overlaps the end 90 of one cavity in member 70, and the end 92 overlaps the end 94 of another cavity in member 70. A third cavity ending at 93 in member 70 is located between the two cavities ending at 90 and 94 (Fig. 11).

The ported separator means in this modification need not be a rigid plate; it can be a simple gasket. The apparatus is so designed that no vertical pressures are exerted on unsupported portions of the gasket area, so that the gasket need be adapted only to withstand lateral pressures as in ordinary gasket practice. Fig. 14 shows a gasket 85 as used in this modification. The gasket has fluid ports 86, bolt holes 35, and is shown with two small air bleeds 87. The ports 86 establish connections between overlapping ends of cavities in each member, as shown in Fig. 15. For example, the overlapping ends of cavities 90 and 91 are in communication through one of the ports 86, as shown. The apparatus of Figs. 10 to 14 is of specifical utility in indirect water heating, the apparatus being mounted vertically, and in this case the bleeds 87 are put in to serve as air reliefs when water is heated, by allowing air expelled from the water being warmed and tending to become trapped in member 71 (which has no direct liquid connection), to escape into the other member, whence it is discharged with outgoing water. For most other uses the air bleeds are not provided.

The channeled members and the gasket are assembled in such manner that reference points A in each element are superposed. The course of fluids through the apparatus is shown diagrammatically in Fig. 15, which is a diagrammatic plan sectional view of the apparatus taken along line 15—15 of Fig. 10. The course of the larger flow is indicated by line 60; that of the smaller flow by line 61.

The new heat exchange apparatus comprises few parts, is easy to construct and is reliable in use. In the first two modifications described, three metal members only are required: two similar open castings and one flat ported member. In making up the heat exchange apparatus only four surfaces need be tooled or machined: the open faces of the cover members and the two faces of the separator plate. With certain types of gasket, no machining at all is necessary; all surfaces can be left rough. It is perfectly feasible to cast the channeled members with the partition walls very thin; thereby securing efficient heat transfer. The apparatus of Figs. 10 to 15 is made up of but two channeled parts and a gasket and hence is even more economical to construct. The fluid passages in each embodiment are large, thereby imposing little restriction to flow; while the tortuous direction of the passages makes for high turbulence. The passageways, while of approximately constant area at all points, have different shapes at various sections along the line of flow. This makes for high turbulence with a minimum of resistance. There are no dead ends or pockets.

It is usually convenient to have all fluid connections in a single member of the apparatus. The heat exchanger can be opened for cleaning without disturbing any pipe connections. This easy accessibility makes the apparatus particularly useful in such relations as heating water containing temporary hardness which precipitates as scale. Cleaning of ordinary straight tube exchangers is difficult and coiled tube exchangers are almost impossible to clean mechanically.

My heat exchangers have special utility when installed in situations where they are required to reclaim heat from badly contaminated waste waters. There are no projections or dead ends to catch or collect suspended substances, e. g., lint and the like carried in, for example, laundry waste. Cleaning, which is frequently necessary in the case of ordinary tubular exchangers, is practically done away with. However, it is a simple matter to open up my exchangers for inspection or cleaning, if this is desired. The exchangers have been found useful in indirect heating of boiler feed water and in sampling boiler water.

The exchangers are readily adaptable for construction in any metal that can be cast. The exchangers can be made of cast iron, cast steel, brass, bronze or aluminum, depending on the service to which the exchanger is put. The iron can be readily galvanized or electroplated, as for example, chromium plated, when desired.

The heat exchange apparatus may also be embodied in wrought or machined metal; or, in part, in pressed or stamped metal.

What I claim is:—

1. In a heat exchange apparatus, a member having a flat face, a plurality of cavities in said flat face, another member having a flat face with cavities in said flat face, a separator plate having ports, said two members and said plate being assembled into a unit with the flat faces juxtaposed and with the separator plate between them to connect the cavities to produce in the unit two separate, tortuous, immediately adjacent systems of passageways for fluids, the passageways running substantially as an extended helix through the unit, some of said plurality of cavities in the flat faces of said members cooperating to form the one system of passageways and the remaining cavities in the faces of said members cooperating to form the other system of passageways.

2. The apparatus of claim 1 wherein the cavity arrangement of each member is geometrically identical.

3. Heat exchange apparatus comprising a plurality of members closed on one face and provided with open channels on the other face, separator means between the members, the members being assembled into a unit with the open faces juxtaposed and the separator means between them, the separator means being arranged to separate portions of the channels in one member from portions of the channels in another member, the unit having therein two separate, tortuous, immediately adjacent passageways for fluids running from one end of the unit to the other, the open channels of each member forming parts of both fluid passageways in the unit, the unit having conduit connections for each passageway, and means for holding the members together.

4. Heat exchange apparatus comprising a casing, two separate systems of passageways for fluids in the casing, said passageways being shaped substantially as double-thread advancing helices, and conduit connections for each end of each system of passageways, the apparatus being divided, along at least one plane running parallel to the axis of said helices, into separable parts, whereby the passageways may be readily exposed for cleaning, by separating said parts.

5. Heat exchange apparatus comprising a plurality of open channeled members, a ported separator member, the channeled members and separator member being assembled into a unit, the open channels of each member and the ports in the separator member forming in the unit two separate tortuous, immediately adjacent passageways for fluids running from one end of the unit to the other, the unit having conduit connections for each passageway and means for holding the members together.

6. The apparatus of claim 5 wherein the passageways are approximately helical in course.

7. The apparatus of claim 5 wherein the passageways are approximately helical in course and the channels of each member are approximately parallel to each other and inclined to the longitudinal axis of the member.

8. Heat exchange apparatus comprising a plurality of members assembled into a unit, each member having a casing portion and an opened channeled portion cooperating in the assembled unit to form two separate, tortuous immediately adjacent passageways for fluids, one of said members having fluid connections for all the several fluids.

9. A heat exchanger comprising in combination two opposed members provided with a plurality of adjacent fluid-carrying channels, a separating member between the two members forming in combination with the channels two separate, continuous, adjacent passageways extending from one end of the members to the other end and means for compressing the two members and the interposed separating member together, one of the members having fluid connections in communication with the channels.

10. A heat exchanger comprising in combination a separator member having two open faces and comprising a casing portion and a partition system including a plurality of partitions integral with the member and forming an open-faced channel running from one end of the member to the other, and cover members for the open faces of the separator member cooperating with the partitions to form an enclosed channel leading from one end of the separator member to the other and an enclosed separate inter-partition channel leading from one end of the separator member to the other, both channels advancing substantially helically from one end to the other, and fluid connections in the separator member for the channels.

11. A heat exchanger comprising in combination a separator member having a casing portion and a partition system forming two separate tortuous passages each open on opposite sides and extending from one end of the member to the other, cover members for the open sides cooperating with the separator member to form two separate conduits in the shape of advancing helices, and fluid connections for each end of the two conduits.

12. A heat exchanger comprising in combination two members each having a flat face with a plurality of adjacent substantially U-shaped cavities therein, separating means interposed between the flat faces of the two members and having a plurality of ports therein, said ports connecting the overlapping ends of the cavities in the two members, the members and separating means forming two separate tortuous passages each comprising a plurality of cavities and a plurality of ports, and inlet and outlet connections at opposite ends of each passage.

13. A heat exchanger comprising in combination two members each having a flat face and a plurality of cavities in the flat face, ported separating means interposed between the flat faces, the cavities being so arranged that each end of one cavity in the one member overlaps one end of one of two cavities in the other member, said two cavities being spaced apart and separated by a third cavity in said other member, the ports in the separating means establishing communication between the overlapping ends of the cavities in the two members.

14. A heat exchanger comprising in combination two members each having a flat face and a plurality of cavities in the flat face, ported separating means interposed between the flat faces, the cavities being so arranged that one end of one cavity in the one member overlaps one end of one cavity in the other member and the other end of said cavity in the one member overlaps one end of another cavity in the other member, the said two cavities in the other member being spaced apart by a third cavity in the other member, the ports in the separating means establishing connection between the overlapping ends of the cavities in the two members.

15. A heat exchange apparatus comprising a casing, two separate, tortuous, immediately adjacent systems of passageways for fluids in the casing, conduit connections for each end of each system of passageways, the apparatus being divided into two parts along a plane running lengthwise of the apparatus, said plane intersecting each of the two systems of passageways in a plurality of places, and means at right angles to said plane for holding the parts together.

16. A heat exchange apparatus comprising a casing, two separate, immediately adjacent systems of passageways for fluids in the casing substantially in the shape of advancing helices, conduit connections for each end of each system of passageways, the apparatus being divided into two parts along a plane running lengthwise of the apparatus, at least one of said two parts having therein two systems of passages opening into said plane and closed on the side opposite said plane, and means for holding the two parts together.

17. Heat exchange apparatus comprising a separator member having two flat faces on opposite sides thereof, partitions in the member defining one set of intercommunicating cavities opening into each face and a second and separate set of intercommunicating cavities opening into each face, and cover members for each flat face arranged to prevent intercommunication between the two sets of cavities.

18. A heat exchanger comprising at least one elongated member having a flat face provided with a plurality of separate cavities extending substantially cross-wise thereof and opening into said flat face, and blocking means for covering said flat face and portions of the cavities to form separate, tortuous passageways extending from one end of the apparatus to the other.

19. In a heat exchange apparatus, separate members having flat faces, a plurality of cavities in the flat face of at least one of the members, and the two members being assembled into a unit with their flat faces juxtaposed to complete and define passages of certain of the cavities to produce a unit with two separate tortuous, intermediate, adjacent systems of passageways for fluids, running substantially as an extended helix through the unit, some of said plurality of cavities in the flat face of said first named member cooperating to form the one system of passageways and the remaining cavities in the face of said first named member cooperating to form the other system of passageways.

20. Heat exchange apparatus comprising a separator member having two flat faces on opposite sides thereof, two systems of passageways in the separator member, each of said systems comprising one set of cavities opening into the one flat face and another set of cavities opening into the other flat face, each cavity of the one set communicating within the separator member with two cavities of the other set, and cover members for each flat face arranged to prevent intercommunication between the two systems of passageways.

ERIC PICK.